United States Patent
Poisner

(10) Patent No.: US 6,438,709 B2
(45) Date of Patent: *Aug. 20, 2002

(54) METHOD FOR RECOVERING FROM COMPUTER SYSTEM LOCKUP CONDITION

(75) Inventor: David I. Poisner, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 08/999,024

(22) Filed: Dec. 29, 1997

Related U.S. Application Data

(63) Continuation-in-part of application No. 08/933,260, filed on Sep. 18, 1997.

(51) Int. Cl.[7] ................................................ H02H 3/05
(52) U.S. Cl. ............................ 714/23; 714/22; 714/24; 714/38; 714/47
(58) Field of Search ............................ 714/22–24, 15, 714/38, 47

(56) References Cited

U.S. PATENT DOCUMENTS

| | | | | |
|---|---|---|---|---|
| 4,654,821 A | * | 3/1987 | Lapp ........................... | 364/900 |
| 5,864,656 A | * | 1/1999 | Park ........................ | 395/182.08 |
| 5,951,686 A | * | 9/1999 | MacLaughlin ................ | 713/2 |
| 5,956,475 A | * | 9/1999 | Burckhartt et al. .... | 395/182.21 |
| 6,061,810 A | * | 5/2000 | Potter .......................... | 714/23 |
| 6,230,286 B1 | * | 5/2001 | Shapiro et al. ............... | 714/23 |
| 6,253,320 B1 | * | 6/2001 | Sekiguchi et al. ............. | 713/2 |
| 6,314,532 B1 | * | 11/2001 | Daudelin et al. ............. | 714/38 |

* cited by examiner

*Primary Examiner*—Norman M. Wright
(74) *Attorney, Agent, or Firm*—Calvin E. Wells

(57) ABSTRACT

In one embodiment of a method for recovering from a computer system lockup condition, an interrupt is generated to the computer system's operating system notifying the operating system of the lockup condition. An operating system interrupt handler is then executed. The interrupt handler performs at least one step to attempt to cure the lockup condition. If the interrupt handler fails to cure the lockup condition, the interrupt is regenerated to the operating system notifying the operating system of the lockup condition. The interrupt handler is then re-executed in response to the regeneration of the interrupt, with the interrupt handler performing a further step in attempting to cure the lockup condition.

11 Claims, 3 Drawing Sheets

METHOD FOR RECOVERING FROM COMPUTER SYSTEM LOCKUP CONDITION

This application is a continuation-in-part of U.S. Ser. No. 08/933,260, entitled "Method and Apparatus Detecting and Recovering From Computer System Malfunction", filed Sep. 18, 1997.

Reference is made to the following commonly assigned copending patent applications:

Ser. No. 08/935,115, entitled "Method and Apparatus for Detecting and Reporting Failed Microprocessor Reset"; and Ser. No. 08/933,629, entitled "Method and Apparatus for Reporting Malfunctioning Computer System", each of which is incorporated by reference herein.

BACKGROUND OF THE INVENTION

1. Field of the Invention

The present invention pertains to the field of computer systems. More particularly, this invention pertains to the field of recovering from computer system malfunctions.

2. Background of the Related Art

For many years, computer system manufacturers, computer component manufacturers, and computer users have been concerned with detecting and recovering from computer system malfunctions. There are many reasons why a computer system might malfunction, including memory data corruption, data corruption related to fixed disks or removable media, operating system errors, component errors, components overheating, applications or operating systems performing illegal instructions with respect to the processor, incompatibility between various hardware and software system components, etc.

Some of these types of malfunctions have been effectively dealt with by prior systems. For example, memory data corruption can be handled by parity detection and/or error correcting code (ECC). Illegal instructions can be trapped by the processor and in many cases handled either within the processor or by the operating system. Other malfunctions may result in system "hangs." A system is "hanged" when it is no longer able to respond to user inputs and/or is not able to respond to system events including, but not limited to, incoming network traffic, etc. Some malfunctions that can result in system hangs include operating systems or hardware components entering unknown or indeterminate states, causing the operating system or hardware component to cease normal operation. In these cases, the computer user must restart the computer. Restarting the computer after a system hang can cause problems such as data loss and corruption.

Some prior computer systems have included timers known as "watchdog" timers. A typical watchdog timer implementation involves a processor periodically resetting a timer, and under normal operation the timer never reaches a certain value. If the timer ever reaches the certain value, the computer system is reset. This solution causes no action to take place to attempt to cure the malfunction other than to take the drastic action of resetting the computer system. Resetting the computer system may result in the same problems mentioned above with regard to a user restarting a computer, including data loss and corruption.

Separate error checking processors have been included in computer systems in order to detect and attempt to recover from system hangs. This solution has the disadvantage of being costly. The computer user benefits from less costly computer systems. Therefore, a lower cost method and apparatus for detecting and recovering from computer system malfunctions is desirable.

SUMMARY OF THE INVENTION

A method for recovering from a computer system lockup condition is disclosed. In one embodiment of the method, as interrupt is generated to the computer system's operating system notifying the operating system of the lockup condition. An operating system interrupt handler is then executed. The interrupt handler performs at least one step to attempt to cure the lockup condition. If the interrupt handler fails to cure the lockup condition, the interrupt is regenerated to the operating system notifying the operating system of the lockup condition. The interrupt handler is then re-executed in response to the regeneration of the interrupt, with the interrupt handler performing a further step in attempting to cure the lockup condition.

DETAILED DESCRIPTION

A method for recovering from a computer system lockup condition is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of detecting and recovering from computer system malfunctions. In general, and in accordance with one embodiment of the invention, a timer is set upon starting the computer. An operating system-related software agent running on a processor periodically resets the timer. If the timer ever expires, an interrupt is generated which causes the processor to execute an interrupt handler which is unrelated to the operating system. The term "interrupt" as used herein includes all manner of interrupts, including, but not limited to, Peripheral Component Interconnect (PCI) interrupts, Industry Standard Architecture (ISA) interrupts, System Management Interrupts (SMI), and Non-Maskable Interrupts (NMI). When the interrupt handler is called, the timer is reset by the interrupt handler to its initial value. The interrupt handler causes the timer to be periodically reset while it attempts to cure the malfunction that caused the timer to expire previously. If the timer expires while the interrupt handler is executing, a partial reset is performed. The partial reset fully resets the processor and further resets portions of other system components. The partial reset allows the state of the various system components to be maintained while the system is restarted.

Embodiments of the Invention

Figure 1:
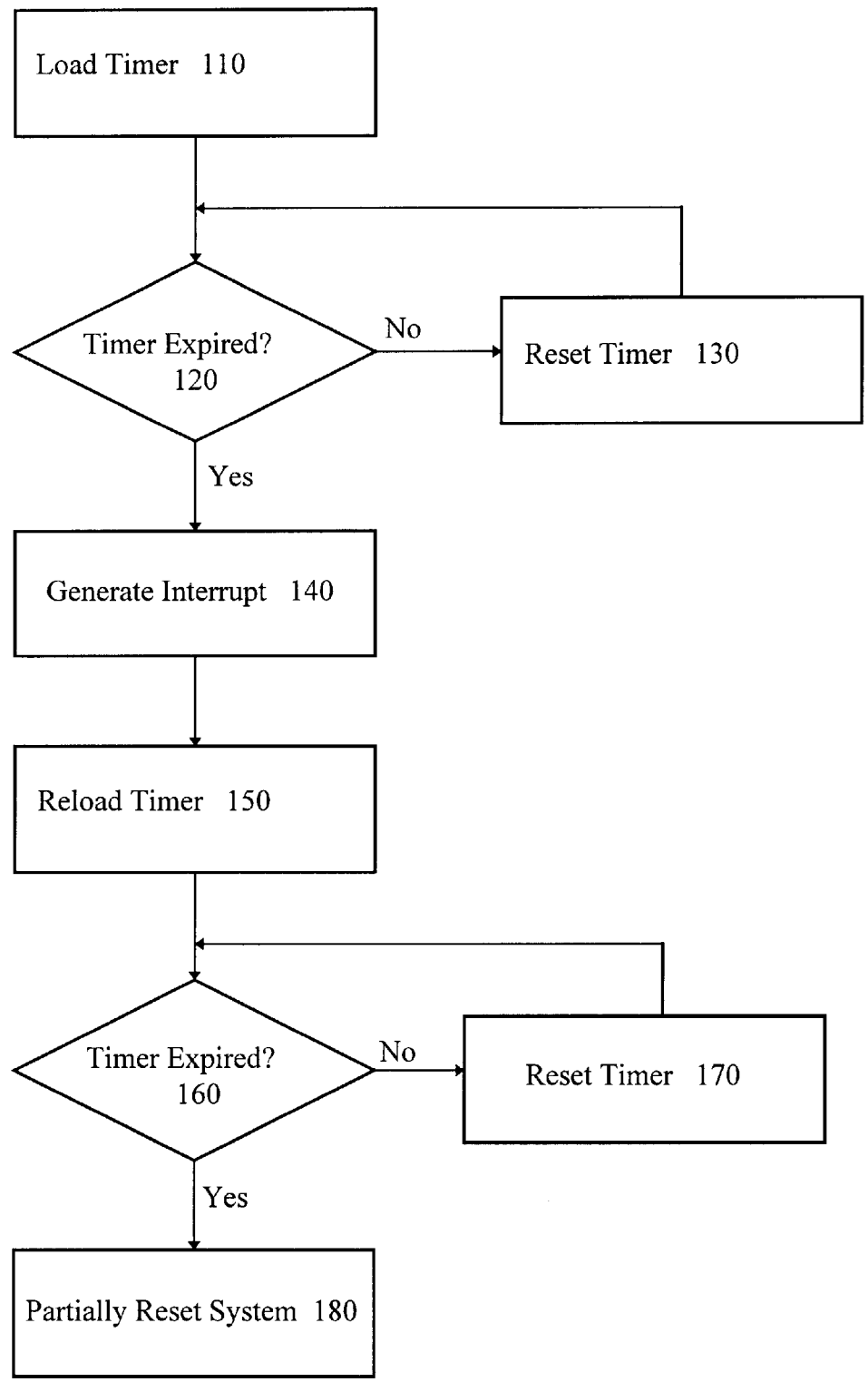
FIG. 1 shows a flow diagram of a method for detecting and recovering from a computer system malfunction implemented in accordance with one embodiment of the invention.

FIG. 1 shows a flow diagram of a method for detecting and recovering from a computer system malfunction implemented in accordance with one embodiment of the invention. At step 110, a timer is loaded. The timer may be a count-down timer that is initially loaded with a value and over a period of time counts down to zero unless it is reloaded. Other types of timers or counters may also be used with the invention, including counters that start at a value and count up until a trigger value is reached. In the present embodiment, the timer is of the count-down type. The timer is initially loaded upon system start up as part of the boot process.

Following the load timer step 110, the timer is checked after a period of time at step 120 in order to determine whether the timer has expired. The checking is preferably performed by a software agent running on a processor. The software agent is typically related to an operating system. If the timer has not expired, the software agent causes the timer to be reset at step 130. Following step 130, the timer is again rechecked after a period of time at step 120. Steps 120 and 130 are repeated continuously so long as no computer system malfunction exists that would prevent the software agent from resetting the timer. Malfunctions that would prevent the timer from being reset include the operating system misbehaving in such a manner that it is unable to schedule and run the software agent. Another possible malfunction that would prevent the software agent from resetting the timer is a broken data or address path between the processor and the timer such that even though the operating system is behaving properly and the processor is able to run the software agent, the processor is not able to cause the timer to be reloaded. The processor itself may also malfunction in such a manner that it is unable to execute the software agent. Other malfunctions are possible, including the operating system waiting for a misbehaving peripheral.

If the timer does expire, an interrupt is generated at step 140. In this embodiment, the generated interrupt causes the processor to execute an interrupt handler. As mentioned above, it is possible that a processor malfunction caused the timer to expire. If the processor is not operating properly, it likely will not be able to execute the interrupt handler. This case is discussed below. The discussion below regarding the execution of the interrupt handler assumes that the processor is operating in such a manner that it is able to execute the handler.

The interrupt handler is not related to the operating system and is stored in non-operating system memory space. Since the interrupt handler is not related to the operating system, the processor is able to execute the interrupt handler even if the operating system is behaving improperly. The interrupt handler attempts to investigate and cure the malfunction that allowed the timer to expire. It is possible for the interrupt handler to attempt to cure a broad range of possible system malfunctions.

Upon the generation of the interrupt, the timer is reloaded at step 150. The reloading is preferably accomplished automatically by system logic. The processor cannot be relied on to perform the reload timer step 150 since a processor malfunction may have resulted in the timer expiring.

The interrupt handler checks the timer to see if it has expired a second time at step 160. If the timer has not expired, the timer is reset by the interrupt handler at step 170. Steps 160 and 170 are periodically repeated so long as the interrupt handler is executing. If the timer expires a second time, it is likely an indication that either the processor is unable to execute the interrupt handler or there is a broken data or address path between the processor and the timer such that even if the processor is able to properly execute the interrupt handler the timer is never reset.

If the timer expires a second time, a system reset occurs at step 180. Preferably, the system reset is a partial system reset. A partial system reset may involve the processor, the memory controller, and portions of system peripherals. The partial system reset seeks to retain system state information so that the system can attempt to cure system malfunctions during the reboot process. An indication is preferably maintained by the system logic that indicates to the system Basic Input/Output System (BIOS) that the current boot process was triggered by a partial system reset and that steps should be taken to investigate and attempt to cure any system malfunctions.

In an alternative embodiment, the timer is reloaded a second time upon the generation of the partial system reset. The BIOS periodically resets the timer during the boot process and while it attempts to cure any malfunctions. Should the timer expire a third time, a more complete system reset is performed and the boot process is attempted again. The steps of loading the timer, periodically resetting the timer during the boot process and while attempting to cure the malfunction, and performing a more complete system reset can be repeated any number of times. Each time the timer expires, more severe actions can be performed in order to attempt to cure the malfunction. The most severe action might include powering down and then powering up the system.

Figure 2:
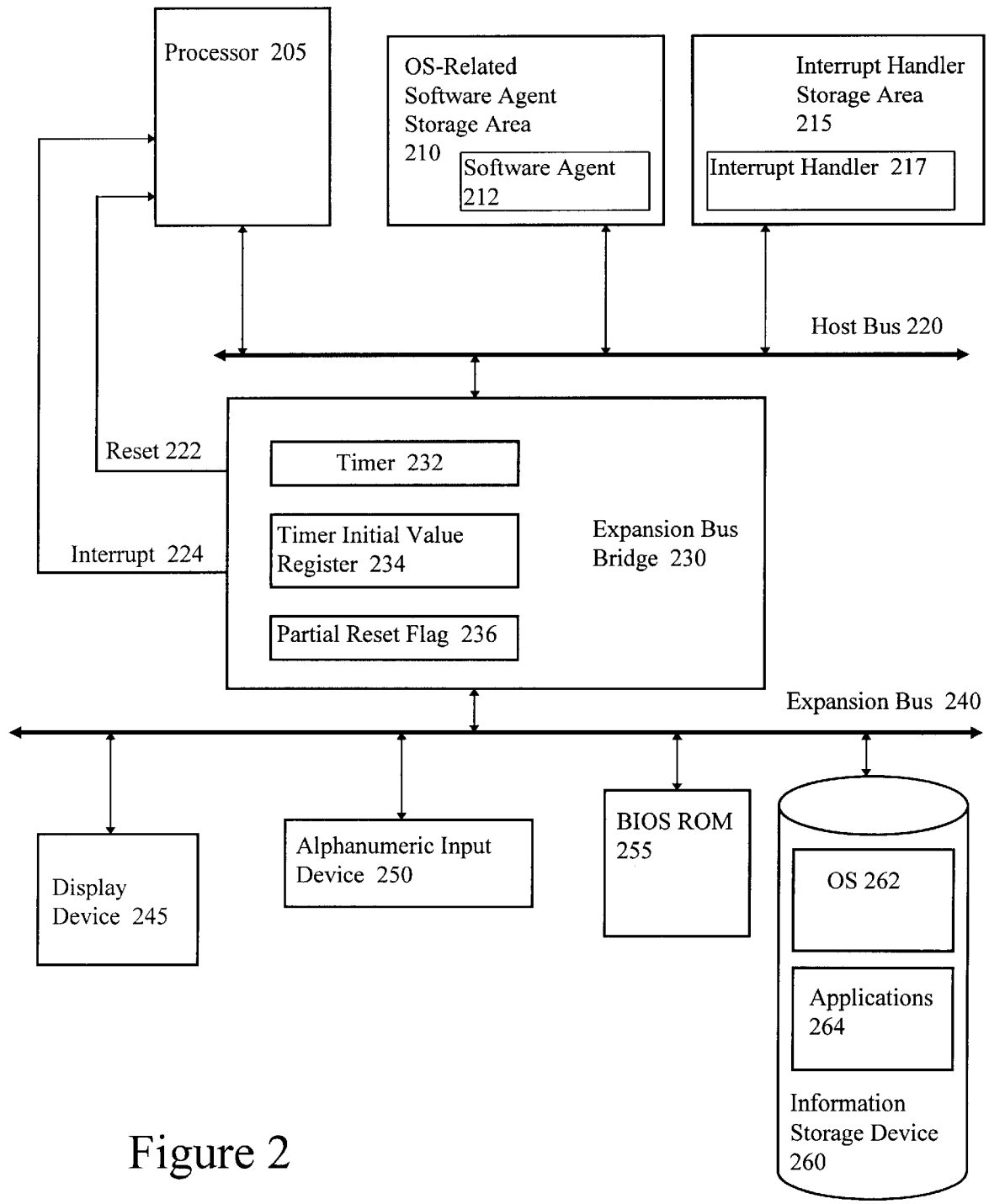
FIG. 2 depicts a block diagram of computer system implemented in accordance with one embodiment of the invention.

FIG. 2 depicts a block diagram of a computer system 200 implemented in accordance with one embodiment of the invention. The computer system 200 typically includes a host bus 220 for communicating information, such as instructions and data. The system further includes a processor 205, coupled to the host bus 220, for processing information according to programmed instructions, and memory devices including an operating system-related software agent storage area 210 and an interrupt handler storage area 215 coupled to the host bus 220 for storing information for processor 205. The storage area 210 has stored therein a software agent 212 and the storage area 215 has stored therein an interrupt handler 217.

The processor 205 could be an 80960, 386, 486, Pentium® processor, Pentium® Pro processor, or Pentium® II processor made by Intel Corp., among others, including processors that are compatible with those listed above. The memory devices 210 and 215 may include a random access memory (RAM) to store dynamic information for processor 205, a read-only memory (ROM) to store static information and instructions for processor 205, or a combination of both types of memory.

An expansion bus bridge 230 couples the host bus 220 to an expansion bus 240. Devices coupled to the expansion bus 240 include a display device 245, and alphanumeric input device 250, a BIOS read-only memory 255, and an information storage device 260 for storing information including an operating system 262 and applications 264.

In alternative designs for the computer system 200, information storage device 260 could be any medium for storage of computer readable information. Suitable candidates include a read-only memory (ROM), a hard disk drive, a disk drive with removable media (e.g., a floppy magnetic disk or an optical disk), or a tape drive with removable media (e.g., magnetic tape), synchronous DRAM or a flash memory (i.e., a disk-like storage device implemented with flash semiconductor memory). A combination of these, or other devices that support reading or writing computer readable media, could be used.

The display device 245 may be a liquid crystal display, a cathode ray tube, or any other device suitable for creating graphic images or alphanumeric characters recognizable to the user. The alphanumeric input device 250 typically is a keyboard with alphabetic, numeric, and function keys, but it may be a touch sensitive screen or other device operable to input alphabetic or numeric characters.

The expansion bus bridge 230 includes a timer 232, a timer initial value register 234, and a partial reset flag 236. The timer 232, timer initial value register 234, and partial reset flag 236 are not restricted to being included in the expansion bus bridge, but may be located elsewhere in the system.

Upon system start-up, the timer 232 is loaded with the value stored in the timer initial value register 234. The timer 232 is then periodically reset with the value stored in register 234 by the software agent 212. The software agent 212 is periodically scheduled to execute on the processor by the operating system 262. If the timer 232 expires, an interrupt signal 224 is asserted to the processor 205. The interrupt signal 224 causes the processor to execute the interrupt handler 217. Also, when the timer 232 expires the timer 232 is automatically reloaded with the value stored in register 234.

The interrupt handler 217 attempts to investigate and cure any system malfunction that resulted in the timer 232 expiring. Further, while the interrupt handler 217 is executing it periodically resets the timer 232 in order to prevent it from expiring again.

If the timer 232 expires a second time, a reset signal 222 is sent to the processor. The reset signal 222 may also be communicated to other system devices. The reset signal 222 causes the processor and possible other devices to perform a partial reset. The partial system reset is discussed above in connection with FIG. 1. When the reset signal 222 is asserted, the partial system reset flag 236 is set. When the system restarts as a result of the partial system reset, the BIOS (stored in BIOS ROM 255), when executed by the processor 205 during the boot process, will cause the partial reset flag 236 to be read in order to determine whether a partial reset has occurred. If the flag is set, the BIOS will attempt to cure any system defects, as discussed above in connection with FIG. 1.

It will be clear to one skilled in the art that the invention can operate upon a wide range of programmable computer systems, not just the example computer system 200.

Figure 3:
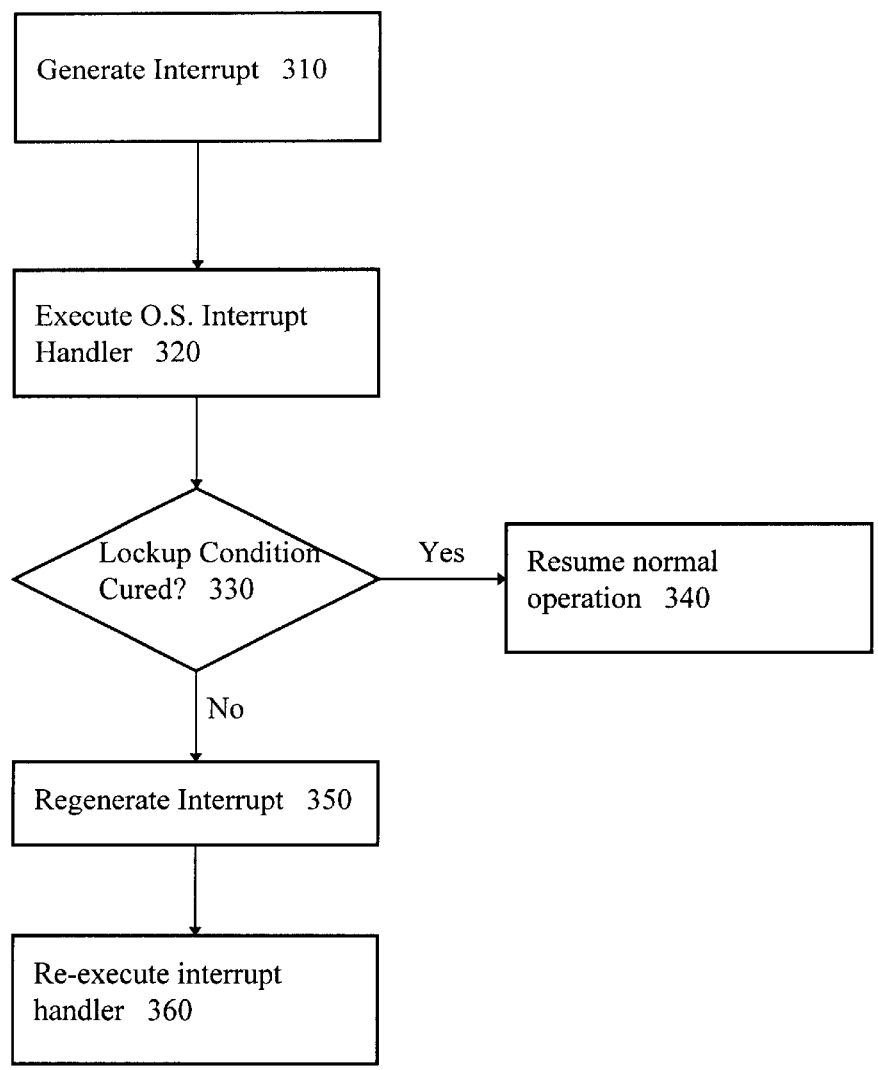
FIG. 3 is a flow diagram of one embodiment of a method for recovering from a computer system lockup condition implemented in accordance with the invention.

FIG. 3 shows a flow diagram of one embodiment of a method for recovering from a computer system lockup condition. The term "lockup" as used herein has the same meaning as the term "hang" as described previously. A lockup condition exists when the computer system is no longer able to respond to user inputs. The method of FIG. 3 involves executing an operating system interrupt handler in order to attempt to cure a lockup condition. This is in contrast to the method described above in connection with FIG. 1 where the executed interrupt handler is unrelated to the operating system.

In the method of FIG. 3, an interrupt is generated at step 310. This interrupt signifies to the operating system that a lockup condition exists. The method of FIG. 3 may be practiced with any method, technique, or device for determining the existence of a lockup or system hang condition, including those techniques mentioned in connection with FIGS. 1 and 2. The interrupt may be signaled by loading a value into a register. The value may signify to the operating system that a lockup condition exists. The register may also be loaded with other information for passing on to the operating system, including but not limited to time stamps, pointers to data, methods or devices by which the lockup condition was detected, etc.

Once the interrupt has been signaled to the operating system, the operating system causes an interrupt handler to be executed at step 320. The interrupt handler attempts to cure the lockup condition. This attempt to cure the lockup condition may include manipulating computer system resources under operating system control. For example, the interrupt handler may attempt to ensure that various interrupts are enabled and/or unmasked. The interrupt handler may also take steps to ensure that critical system resources, including but not limited to, disk drive or network interfaces, are enabled. The handler may also cause critical system resources to exit low-power states, if required.

Following the execution of the operating system interrupt handler, if the interrupt handler succeeded in curing the lockup condition, the computer system resumes normal operation, as represented by steps 330 and 340. If the interrupt handler failed to cure the lockup condition, the interrupt is regenerated at step 350. The same methods or devices used to initially determine the lockup condition may be used to detect the failure to cure the lockup condition.

After regenerating the interrupt at step 350, the interrupt handler is re-executed at step 360. During the re-execution of the handler, further attempts are made to cure the lockup condition. For example, the handler may cause additional interrupts to be enabled and/or unmasked. Alternatively, the handler may attempt to enable additional critical system resources in an attempt to cure the lockup condition.

Steps 330, 350, and 360 may be repeated as many times as necessary to cure the lockup condition. Each time the interrupt handler is re-executed at step 360, further, perhaps more drastic steps may be taken to cure the lockup condition. For example, the interrupt handler may, after one or more attempts to cure the lockup condition, cause open files or even the entire current state of the computer system to be saved to nonvolatile storage. The operating system or interrupt handler may then cause the operating system to restart or may cause the computer system to reset. Before causing the operating system to restart or the system to reset, the operating system or interrupt handler may cause a flag to be set indicating to the operating system upon restart that the restart is a result of a lockup condition. The operating system or the interrupt handler may also send messages that the lockup condition exists and possibly also what actions have been taken in an attempt to cure the condition. The messages may be sent to the computer system monitor or may be sent over a network to a system administrator.

The embodiment of a method to recover from a computer system lockup condition discussed above in connection with FIG. 3 does not require interaction on the part of the computer system user. Consequently, the method of FIG. 3 provides the ability to recover from lockup conditions without the computer system user perceiving any loss of performance or data.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly illustrative rather than in a restrictive sense.

What is claimed is:

1. For a computer system including a microprocessor executing an operating system, a method for recovering from a computer system lockup condition, the method comprising:

generating an interrupt to the operating system notifying the operating system of the lockup condition;

executing an operating system interrupt handler that performs a first function to attempt to cure the lockup condition;

regenerating the interrupt to the operating system notifying the operating system of the lockup condition if the previous execution of the interrupt handler failed to cure the lockup condition; and re-executing the interrupt handler in response to the regeneration of the interrupt, the interrupt handler to perform a second function in attempting to cure the lockup condition, the second function separate from the first function.

2. The method of claim 1 wherein generating an interrupt to the operating system includes loading a value to a register, the value indicating to the operating system that a lockup condition exists.

3. The method of claim 1 wherein generating an interrupt to the operating system includes loading a value in a register in response to the operating system failing to reset a counter within a predetermined period of time, the value indicating to the operating system that the lockup condition exists.

4. The method of claim 1 wherein the regenerating the interrupt to the operating system includes loading a value in a register in response to the operating system failing to reset a counter within a predetermined period of time, the value indicating to the operating system that the lockup condition exists.

5. The method of claim 1 wherein the first function includes enabling an interrupt in an attempt to cure the lockup condition.

6. The method of claim 1 further comprising:

saving the state of the computer system in a non-volatile storage device if re-executing the interrupt handler fails to cure the lockup condition; and causing the computer system to reset once the state of the computer system is saved.

7. The method of claim 6 further comprising setting a hardware flag before the computer system is reset, the flag indicating to the operating system upon an operating system restart that the reset of the computer system was a result of the lockup condition.

8. The method of claim 1 wherein the first function includes causing an input/output device to exit a low-power state in an attempt to cure the lockup condition.

9. The method of claim 1 wherein the first function includes the step of enabling an input/output device interface in an attempt to cure the lockup condition.

10. The method of claim 9 wherein enabling an input/output device interface in an attempt to cure the lockup condition includes enabling a disk drive interface.

11. The method of claim 9 wherein enabling an input/output device interface in an attempt to cure the lockup condition includes enabling a network interface.

* * * * *